United States Patent
Balk et al.

(10) Patent No.: US 8,431,652 B2
(45) Date of Patent: Apr. 30, 2013

(54) METHOD FOR PRODUCING SILYL-FUNCTIONALIZED ABA TRIBLOCK COPOLYMERS ON THE BASIS OF (METH)ACRYLATE

(75) Inventors: Sven Balk, Frankfurt (DE); Gerd Loehden, Essen (DE); Holger Kautz, Haltern am See (DE); Christine Troemer, Hammersbach (DE); Monika Maerz, Alzenau (DE); Lars Zander, Rommerskirchen (DE); Jens Lueckert, Mauer (DE); Johann Klein, Duesseldorf (DE); Thomas Moeller, Duesseldorf (DE)

(73) Assignees: Henkel AG & Co. KGaA, Duesseldorf (DE); Evonik Rohm GmbH, Hanau (DE)

( * ) Notice: Subject to any disclaimer, the term of this patent is extended or adjusted under 35 U.S.C. 154(b) by 0 days.

(21) Appl. No.: 12/992,430

(22) PCT Filed: Apr. 14, 2009

(86) PCT No.: PCT/EP2009/054364
§ 371 (c)(1),
(2), (4) Date: Nov. 12, 2010

(87) PCT Pub. No.: WO2009/144082
PCT Pub. Date: Dec. 3, 2009

(65) Prior Publication Data
US 2011/0086984 A1    Apr. 14, 2011

(30) Foreign Application Priority Data
May 28, 2008  (DE) .......... 10 2008 002 016

(51) Int. Cl.
*C08F 261/00*    (2006.01)
*C08F 293/00*    (2006.01)

(52) U.S. Cl.
USPC ............ 525/288; 525/242; 525/299; 525/302

(58) Field of Classification Search .................. 525/242, 525/288, 298, 299, 302
See application file for complete search history.

(56) References Cited

U.S. PATENT DOCUMENTS

| | | |
|---|---|---|
| 2004/0147674 A1 | 7/2004 | Kakeda et al. |
| 2007/0117948 A1 | 5/2007 | Loehden et al. |
| 2008/0139689 A1 | 6/2008 | Huang et al. |
| 2008/0262176 A1 | 10/2008 | Loehden et al. |
| 2009/0062508 A1 | 3/2009 | Balk et al. |
| 2009/0275707 A1 | 11/2009 | Balk et al. |
| 2009/0312498 A1 | 12/2009 | Balk et al. |
| 2009/0326163 A1 | 12/2009 | Balk et al. |
| 2010/0041852 A1 | 2/2010 | Balk et al. |
| 2010/0204418 A1* | 8/2010 | Marc et al. ............. 526/87 |

FOREIGN PATENT DOCUMENTS

| | | |
|---|---|---|
| DE | 10 2005 045458 | 3/2007 |
| JP | 2002060449 A1 * | 2/2002 |
| WO | WO-2007115848 A1 * | 10/2007 |
| WO | 2008 021500 | 2/2008 |
| WO | 2009 033974 | 3/2009 |

OTHER PUBLICATIONS

Masaoka, Y., et al., "New durable sealant of telechelic polyacrylate," ASTM Special Technical Publication—Durability of Building and Construction Sealants and Adhesives: 2$^{ND}$ Symposium, vol. 1488 STP, (2007), (English Abstract only).
International Search Report issued Jul. 31, 2009 in PCT/EP09/054364 filed Apr. 14, 2009.

* cited by examiner

*Primary Examiner* — Irina S Zemel
*Assistant Examiner* — Jeffrey Lenihan
(74) *Attorney, Agent, or Firm* — Steven C. Bauman; James E. Piotrowski

(57) ABSTRACT

The invention relates to a process for preparing (meth)acrylate-based ABA triblock copolymers with a silyl functionalization of the A blocks.

28 Claims, No Drawings

METHOD FOR PRODUCING SILYL-FUNCTIONALIZED ABA TRIBLOCK COPOLYMERS ON THE BASIS OF (METH)ACRYLATE

The invention relates to a process for preparing (meth) acrylate-based ABA triblock copolymers with a silyl functionalization of the A blocks and to their use for example as binders in adhesives or sealants.

Tailor-made copolymers with defined composition, chain length, molar mass distribution, etc. are a broad field of research. One of the distinctions made is between gradient polymers and block polymers. A variety of applications are conceivable for such materials. A number of them will be briefly presented below.

Block polymers have a sharp transition between the monomers in the polymer chain, which is defined as a boundary between the individual blocks. A typical synthesis process for AB block polymers is the controlled polymerization of monomer A and, at a later point in time, the addition of monomer B. Besides sequential polymerization by batchwise addition to the reaction vessel, a similar result can also be obtained by sharply altering the compositions of the two monomers, in the case of their continuous addition, at defined points in time. In this case, a gradient copolymer is obtained.

Suitable living or controlled polymerization methods include not only anionic polymerization or group-transfer polymerization but also modern methods of controlled radical polymerization such as, for example, RAFT polymerization. The mechanism of RAFT polymerization is described in more detail in WO 98/01478 or EP 0 910 587. Application examples are found in EP 1 205 492.

A new mode of polymerization brought the art a good deal closer to the aim of tailor-made polymers. The ATRP method (atom transfer radical polymerization) was developed in the 1990s definitively by Prof. Matyjaszewski (Matyjaszewski et al., J. Am. Chem. Soc., 1995, 117, p. 5614; WO 97/18247; Science, 1996, 272, p. 866). ATRP yields narrowly distributed (homo)polymers in the molar mass range of $M_n=10\,000$-$120\,000$ g/mol. A particular advantage here is that both the molecular weight and the molecular weight distribution can be regulated. As a living polymerization, furthermore, it allows the targeted construction of polymer architectures such as, for example, random copolymers or else block copolymer structures. By means of corresponding initiators it is additionally possible to access, for example, unusual block copolymers and star polymers. Theoretical principles relating to the polymerization mechanism are elucidated in references including Hans Georg Elias, Makromoleküle, Volume 1, 6th Edition, Weinheim 1999, p. 344.

Controlled-growth free-radical methods are also suitable particularly for the targeted functionalization of vinyl polymers. Particular interest attaches here to silyl functions, among others. Particularly of interest are functionalizations on the chain ends (referred to as telechels) or in the vicinity of the chain ends.

All of these polymers described are prepared either by way of ionic addition polymerization processes or by polycondensation or polyaddition. In these processes the preparation of endgroup-functionalized products is unproblematic. In contrast, the targeted functionalization at the chain end is virtually impossible in the case of free-radical addition polymerization. Accordingly, polystyrenes or polymethacrylate have to date played only a minor part in respect of applications as formulation constituents for sealants. One possibility for preparing such products has been added, however, with the development of controlled-growth free-radical addition polymerization methods such as, for example, that of ATRP. Accordingly these monomers too are now available for the construction of corresponding polymer architectures.

A method already established for preparing silyl-telechelic polymers—that is, polymers having silyl groups located precisely on the two chain ends—is the endgroup functionalization of a poly(meth)acrylate with olefinic groups and the subsequent hydrosilylation of those groups.

One possibility of providing poly(meth)acrylates synthesized by ATRP with olefinic functionalization on the endgroups is described in US 2005/0113543. Disadvantages of this process, in which one olefinic group is introduced by an unsaturated initiator and the other by substitution of the halogenated chain end by organotin compounds, involving transfer of an allyl group, are the unavoidable multi-stage character of the process, the use of toxicologically objectionable tin compounds, and a monofunctional initiation, which rules out the synthesis of symmetrical ABA triblock copolymers of the invention.

The application of a single-stage process for the synthesis of olefinically terminated poly(meth)acrylates is described in EP 1 085 027. By adding non-conjugated dienes to a polymerization solution initiated using a bifunctional ATRP initiator, the polymerization is discontinued and the product is terminated. The method is described in greater precision in EP 1 024 153 and EP 1 153 942. Those publications also describe the use of the materials as an intermediate to a further reaction to give silyl-terminated products. An analogous reaction, in which the hydrosilylation and the crosslinking are carried out simultaneously, is found in EP 1 277 804. All of these descriptions propose exclusively purely terminated products. None of the polymers described has a block structure. EP 1 158 006 extends the above-described termination approaches in a number of respects: on the one hand, the group of reagents suitable for the termination is expanded to include cyclic dienes such as cyclooctadienes, for example. This supplementation, however, is not seen as extending the polymer architecture.

A great disadvantage of these products as compared with those of the invention is the two-stage preparation process. Whereas the copolymerization of silyl-functional monomers in accordance with the invention provides a simple, one-stage process, the polymer-analogous reaction described not only is two-stage but additionally necessitates the implementation, between the actual polymerization and the hydrosilylation, of a costly and inconvenient product purification procedure. This purification must be very thorough, since not only transition metals—from the ATRP process, for example—but also, in particular, the polyfunctional, usually aminic ligands that are used in this process have a deactivating effect on the hydrosilylation catalysts such as the Karstedt catalyst, for example. In comparison with the single-stage process of the invention, the multistage process that results from the above is clearly disadvantageous both economically and environmentally.

A further disadvantage of these products as compared with polymers having multiply functionalized, short outer blocks is the greater probability of obtaining products without functionalization at one end.

As a result of the lower degree of functionalization that results in each case in relation to the polymers of the invention, a lower degree of crosslinking is obtained for further follow-on reactions such as, for example, in the curing process of sealant formulations, and this lower degree of crosslinking acts counter to the mechanical stability and chemical resistance of the seal or adhesive layer.

An alternative preparation of silyl-terminated products is described in EP 0 976 766 and in EP 1 059 308. There, in a second process stage, an endgroup functionalization is carried out. Besides the above-described disadvantages of telechelic polymers relative to the block copolymers of the invention, this process is inefficient. To the skilled person it is readily apparent that the reactions described there can lead only to a low level of functionalization.

EP 1 179 567 and EP 1 197 498 describe three-stage processes for the synthesis of corresponding silyl telechels. By substituting the terminal halogen atoms with oxyanions, olefinic groups are introduced at the chain ends. These groups, finally, are hydrosilylated in a third process step.

A disadvantage of free-radically prepared binders of this kind would be a random distribution of the functional groups in the polymer chain. That leads to a tight crosslinking and hence to reduced elasticity on the part of the sealant. Furthermore, impairment of substrate bonding may also result.

Polymers obtained by a free-radical addition polymerization process often exhibit molecularity indices of well above 1.6. In the case of a molecular weight distribution of this kind, therefore, there are unavoidably very short-chain polymers and extremely long-chain polymers in the product as a whole. The short-chain by-products can adversely affect the chemical stability of the product. Long-chain by-products, in contrast, lead to a disproportionate increase in the viscosity of the polymer melt or polymer solution. This effect is in no way compensated by the broad-distribution chains of low molecular mass which are effective as plasticizers in certain circumstances. These disadvantages of free-radically polymerized, (meth)acrylate-based binders can be done away with by the ability, through the use of a controlled polymerization method, in the form of atom transfer radical polymerization, to make binders available which have very narrow molecular weight distributions and which, as compared with free-radically polymerized (meth)acrylates, have a low fraction of high molecular mass constituents. In polymer mixtures these constituents in particular bring about an increase in the viscosity.

Besides telechels and block structures, ATRP-synthesized silyl-containing (meth)acrylate copolymers with a random distribution and a narrow molecular weight distribution represent an alternative. A disadvantage of such binders over the polymers of the invention is the close-knit crosslinking, which is entirely advantageous for coating systems, for example, but which, in the context of formulation in sealants or adhesives, can lead to an embrittlement of the end product and hence to a greater sensitivity to ageing.

Besides ATRP, other methods too are employed for the synthesis of functionalized polymer architectures. The two relevant methods will be described briefly below. In this context there is a delimitation from the present invention in terms of the products and also the methodology. Particular emphasis is given here to the advantages of ATRP over other processes:

DE 38 32 466 describes, among other things, the preparation of P(AMA)-(MMA)-(AMA) triblock copolymers by means of group transfer polymerization (GTP). However, in the context of the materials described in the patent specification it is clearly evident to the skilled person that these polymers readily tend to premature crosslinking reactions and thus cannot be storage-stable even with stabilization. Moreover, in order to obtain silyl-functionalized polymer, it is necessary to carry out a further step of hydrosilylation. The direct synthesis of silyl-functionalized polymethacrylates by way of GTP is unknown from the literature.

Object

A new stage in the development are the triblock copolymers described below.

ABA triblock copolymers are to be equated with 5-block copolymers of composition ACBCA or CABAC.

It was an object to prepare triblock polymers of structure ABA. In particular there is a need for silyl-terminated poly (meth)acrylates and/or poly(meth)acrylates which in terms of their properties match or come very close to silyl-terminated materials. This can be achieved, for example, through the incorporation of one to a few units having silyl groups at the chain end whose polymerization activity is low or zero. Chain ends are used as a term for the end segment of a polymer, accounting for not more than 1-20% by weight of the total weight of the polymer.

Poly(meth)acrylates which carry silyl-functional chain ends, or silyl-terminated poly(meth)acrylates, have suitability as prepolymers for moisture-curing formulations, e.g. in adhesives or sealant applications.

A further object of the invention is to provide polymers containing reactive silyl functionalities, as binders, in such a way that the number of the silyl groups in the polymer, while retaining effective availability for the curing reaction, is minimized.

A further subject of this invention is the functionalization of short A blocks in ABA triblock copolymers through the incorporation of suitable unsaturated monomers during the last stage of a sequential polymerization that have an additional silyl functionality.

A further object is to provide a material having a very narrow molecular weight distribution of less than 1.6, preferably less than 1.4. This minimizes not only the fractions of relatively high molecular mass constituents, whose effects include contributing to an unwanted increase in solution or melt viscosity, but also the fractions of particularly low molecular mass constituents, which can induce deterioration in the solvent resistance of the binder.

It is an object of the present invention, therefore, among others, to provide a binder for sealants that either is silyl-terminated or else has a small number of free silyl groups in the vicinity of the chain ends. When formulated in sealants, such materials feature higher elasticity. This also results in an improvement in adhesion to the substrate.

A further object was to provide a binder with which any premature gelling is prevented.

Solution

The object has been achieved by the making available of block copolymers of composition ABA with at least 1 and at most 4 silyl groups in the individual A blocks, characterized in that block A, a copolymer containing silyl-functionalized (meth)acrylates and monomers selected from the group of (meth)acrylates or mixtures thereof, and one block B, containing (meth)acrylates or mixtures thereof which have no additional silyl function, are polymerized as ABA block copolymers.

It has been found that ABA block copolymers having at least 1 and at most 2 silyl groups in the individual A blocks can also be prepared.

Both to the copolymers of block A and to the copolymers of block B it is possible to add 0-50% by weight of ATRP-polymerizable monomers which are not included in the group of (meth)acrylates.

One preferred embodiment is represented by block copolymers which, with an ABA composition, have ≦4 silyl groups in the individual A blocks and where the block A, a copolymer containing silyl functionalized (meth)acrylates and monomers selected from the group of (meth)acrylates or mixtures thereof and, optionally, further, ATRP-polymerizable monomers which are not included in the group of (meth)acrylates, and one block B, containing (meth)acrylates or mixtures thereof which have no silyl function and, optionally, further, ATRP-polymerizable monomers which are not included in the group of (meth)acrylates, are polymerized as ABA block copolymers, it also being possible for the ATRP-polymerizable monomers to be copolymerized only in block A or to be copolymerized only in block B.

A further service of the present invention is to provide block copolymers which have been specifically functionalized at the ends of the polymer chain.

As compared with the formulations described in the prior art having silyl terminated binders in the formulation, the advantage of an improved crosslink-ability can also be seen in the products of the invention, with a relevantly higher degree of functionalization. As a result of the higher number of reactive groups in the chain end segment, reaction of the silyl groups is more likely, and crosslinking to a comparably close-knit elastomer or to flexible sealant proceeds at a significantly faster rate. Targeted control over the crosslinking density and/or the properties of the crosslinked end product is improved by a distribution of the functionalities in the end segments. Additionally, distribution of the reactive groups over the end segments—in this case the blocks A—rules out excessively close-knit crosslinking. An end segment is a section of the chain that accounts in each case for not more than 25% by mass and preferably not more than 10% by mass, and with very particular preference not more than 5% by mass, of the overall polymer chain.

The block copolymers are prepared by means of a sequential polymerization process. In other words, the monomer mixture for the synthesis of the blocks A, for example, is not added to the system until the monomer mixture for the synthesis of block B, for example, has undergone at least 90% reaction, preferably at least 95%. This process ensures that the B blocks are free from monomers of composition A, and that the A blocks contain less than 10%, preferably less than 5%, of the total amount of the monomers of composition B. According to this definition, the block boundaries are located at the position in the chain at which the first repeating unit of the metered-in monomer mixture—in this example, of the mixture A—is located.

An advantage of the present invention, moreover, is a limited number of functionalities in the respective functionalized polymer blocks. A higher fraction of functional groups in the binder leads to possible premature gelling or at least to an additional increase in the solution or melt viscosity. This object has been achieved through the deliberate attachment of the functionalities at the chain end or in the vicinity thereof.

A further advantage of the block copolymers is the colorlessness and the odourlessness of the product produced.

The possible applications of the materials of the invention include, however, not only binders for sealants or as intermediate for the introduction of other kinds of functionalities. EP 1 510 550, for example, describes a coating composition composed, among other things, of acrylate particles and polyurethanes. A polymer of the invention in a corresponding formulation led to an improvement in the processing properties and to a further alternative of a crosslinking mechanism. Conceivable applications would include, for example, powder coating formulations.

Critical to the success of this process, moreover, is that the silyl group of the silyl-functional monomer, under polymerization conditions, enters into a premature crosslinking reaction not at all or only to a very small extent. The monomers copolymerized for silyl functionalization are distinguished by the following general formula:

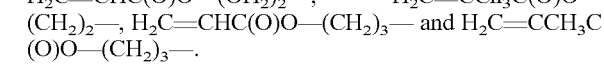

In this formula the organic radicals $R^1$ and $R^2$ may each be identical or different to one another. Furthermore, the organic radicals $R^1$ and $R^2$ are selected from the group of aliphatic hydrocarbon radicals consisting of 1 to 20 carbon atoms.

These groups may be alternatively linear, branched or cyclic. $R^1$ in this case may also exclusively be hydrogen.

X is selected from the group of hydrolysable radicals which are other than alkoxy and hydroxyl. This group includes, among others, halogen, acyloxy, amino, amido, mercapto, alkenyloxy and similar hydrolysable groups.

Moreover, a, b and c are each integers between 0 and 3. The sum a+b+c is 3.

The radical $R^3$ is hydrogen or an aliphatic hydrocarbon radical consisting of 1 to 20 carbon atoms. Preferably $R^3$ is hydrogen (acrylates) or a methyl group (methacrylates).

The radical $R^4$ is a divalent group. Preferably $R^4$ comprises divalent aliphatic hydrocarbon radicals consisting of 1 to 20 carbon atoms. With particular preference $R^4$ is —$CH_2$—, —$(CH_2)_2$— or —$(CH_2)_3$.

Examples of the silyl radicals include —$SiCl_3$, —$SiMeCl_2$, —$SiMe_2Cl$, —$Si(OMe)_3$, —$SiMe(OMe)_2$, —$SiMe_2(OMe)$, —$Si(OPh)_3$, —$SiMe(OPh)_2$, —$SiMe_2(OPh)$, —$Si(OEt)_3$, —$SiMe(OEt)_2$, —$SiMe_2(OEt)$, —$Si(OPr)_3$, —$SiMe(OPr)_2$, —$SiMe_2(OPr)$, —$SiEt(OMe)_2$, —$SiEtMe(OMe)$, —$SiEt_2(OMe)$, —$SiPh(OMe)_2$, —$SiPhMe(OMe)$, —$SiPh_2(OMe)$, —$SiMe(OC(O)Me)_2$, —$SiMe_2(OC(O)Me)$, —$SiMe(O—N=CMe_2)_2$ or —$SiMe_2(O—N=CMe_2)$. The abbreviations here are as follows: Me for methyl, Ph for phenyl, Et for ethyl, and Pr for isopropyl or n-propyl.

Examples of the (meth)acrylic radicals include $H_2C=CHC(O)O—CH_2—$, $H_2C=CCH_3C(O)O—CH_2—$, $H_2C=CHC(O)O—(OH_2)_2—$, $H_2C=CCh_3C(O)O—(CH_2)_2—$, $H_2C=CHC(O)O—(CH_2)_3—$ and $H_2C=CCH_3C(O)O—(CH_2)_3—$.

A commercially available monomer would be, for example, Dynasylan® MEMO from Evonik-Degussa GmbH. This compound is 3-methacryloyloxypropyl-trimethoxysilane.

It is advantageous that the monomers used for the functionalization are polymerized without there being crosslinking reactions.

Within the ABA triblock copolymers the B blocks may in turn inherently have a CDC triblock structure, and, accordingly, the ABA triblock copolymers would be equated with 5-block copolymers of the composition ACDCA. In this case the composition of the C blocks corresponds to the composition of the non-silyl-functionalized fraction in the A blocks.

In the ABA triblock copolymers, the individual A blocks may in turn inherently have a CA' diblock structure. The blocks A' are composed in turn of silyl-functionalized (meth)acrylates and monomers selected from the group of (meth)acrylates or mixtures thereof. The composition of the C blocks differs from the composition of the A' blocks insofar as they contain no silyl-functionalized monomers. Furthermore, the C blocks are not restricted in terms of the weight fraction in the polymer as a whole—in contrast to the A and A' blocks. Accordingly the ABA triblock copolymers would be equated with 5-block copolymers of the composition CA'BA'C pentablock copolymers. In this case the composition of the C blocks corresponds to the composition of the non-silyl-functionalized fraction in the A' blocks.

The (meth)acrylate notation stands for the esters of (meth)acrylic acid and here denotes not only methacrylate, such as methyl methacrylate, ethyl methacrylate, etc., for example, but also acrylate, such as methyl acrylate, ethyl acrylate, etc., for example, and also mixtures of both.

Moreover, a process has been developed for preparing block copolymers of composition ABA. Using a specific form of living polymerization, that of atom transfer radical polymerization (ATRP), it is possible to incorporate well-controlled compositions, architectures and defined functionalities into a polymer.

It has been found that through the use of a bifunctional initiator and a sequential polymerization it is possible to construct ABA, ACDCA or CA'BA'C structures in a controlled fashion.

Monomers which are polymerized both in block A and in block B are selected from the group of (meth)acrylates such as, for example, alkyl(meth)acrylates of straight-chain, branched or cycloaliphatic alcohols having 1 to 40 carbon atoms, such as, for example, methyl(meth)acrylate, ethyl (meth)acrylate, n-butyl(meth)acrylate, isobutyl(meth)acrylate, tert-butyl(meth)acrylate, pentyl(meth)acrylate, 2-ethylhexyl(meth)acrylate, stearyl(meth)acrylate, lauryl(meth) acrylate, cyclohexyl(meth)acrylate, isobornyl(meth) acrylate; aryl(meth)acrylates such as, for example, benzyl (meth)acrylate or phenyl(meth)acrylate which may in each case have unsubstituted or mono- to tetra-substituted aryl radicals; other aromatically substituted (meth)acrylates such as, for example, naphthyl(meth)acrylate; mono(meth)acrylates of ethers, polyethylene glycols, polypropylene glycols or mixtures thereof having 5-80 carbon atoms, such as, for example, tetrahydrofurfuryl methacrylate, methoxy(m) ethoxyethyl methacrylate, 1-butoxypropyl methacrylate, cyclo-hexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether(meth)acrylate and poly(propylene glycol) methyl ether(meth)acrylate.

Besides the (meth)acrylates set out above it is possible for the compositions to be polymerized also to contain further unsaturated monomers which are copolymerizable with the aforementioned (meth)acrylates and by means of ATRP. These include, among others, 1-alkenes, such as 1-hexene, 1-heptene, branched alkenes such as, for example, vinylcyclohexane, 3,3-dimethyl-1-propene, 3-methyl-1-diisobutylene, 4-methyl-1-pentene, acrylonitrile, vinyl esters such as vinyl acetate, styrene, substituted styrenes with an alkyl substituent on the vinyl group, such as α-methylstyrene and α-ethylstyrene, substituted styrenes with one or more alkyl substituents on the ring such as vinyltoluene and p-methylstyrene, halogenated styrenes such as, for example, monochlorostyrenes, dichlorostyrenes, tribromostyrenes and tetrabromo-styrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinylimidazole, vinyloxolane, vinylfuran, vinylthiophene, vinylthiolane, vinylthiazoles, vinyloxazoles and isoprenyl ethers; maleic acid derivatives, such as, for example, maleic anhydride, maleimide, methylmaleimide and dienes such as divinylbenzene, for example, and also, in the A blocks, the respective hydroxy-functionalized and/or amino-functionalized and/or mercapto-functionalized compounds. Furthermore, these copolymers may also be prepared such that they have a hydroxyl and/or amino and/or mercapto functionality in one substituent. Examples of such monomers include vinylpiperidine, 1-vinylimidazole, N-vinylpyrrolidone, 2-vinylpyrrolidone, N-vinylpyrrolidine, 3-vinylpyrrolidine, N-vinylcaprolactam, N-vinylbutyrolactam, hydrogenated vinylthiazoles and hydrogenated vinyloxazoles. Particular preference is given to copolymerizing vinyl esters, vinyl ethers, fumarates, maleates, styrenes or acrylonitriles with the A blocks and/or B blocks.

The process can be carried out in any desired halogen-free solvents. Preference is given to toluene, xylene, $H_2O$; acetates, preferably butyl acetate, ethyl acetate, propyl acetate; ketones, preferably ethyl methyl ketone, acetone; ethers; aliphatics, preferably pentane, hexane; biodiesel; but also plasticizers such as low-molecular-mass polypropylene glycols or phthalates.

The block copolymers of composition ABA are prepared by means of sequential polymerization.

Besides solution polymerization the ATRP can also be carried out as emulsion, miniemulsion, microemulsion, suspension or bulk polymerization.

The polymerization can be carried out under atmospheric, subatmospheric or superatmospheric pressure. The temperature of polymerization is also not critical. In general, however, it is situated in the range from −20° C. to 200° C., preferably from 0° C. to 130° C. and with particular preference from 50° C. to 120° C.

The polymer of the invention preferably has a number-average molecular weight of between 5000 g/mol and 100 000 g/mol, with particular preference between 7500 g/mol and 50 000 g/mol and with very particular preference ≦30 000 g/mol.

It has been found that the molecular weight distribution is below 1.6, preferably below 1.4 and ideally below 1.3.

As bifunctional initiators there can be $RO_2C-CHX-(CH_2)_n-CHX-CO_2R$, $RO_2C-C(CH_3)X-(CH_2)_n-C(CH_3)X-CO_2R$, $RO_2C-CX_2-(CH_2)_n-CX_2-CO_2R$, $RC(O)-CHX-(CH_2)_n-CHX-C(O)R$, $RC(O)-C(CH_3)X-(CH_2)_n-C(CH_3)X-C(O)R$, $RC(O)-CX_2-(CH_2)_n-CX_2-C(O)R$, $XCH_2-CO_2-(CH_2)_n-OC(O)CH_2X$, $CH_3CHX-CO_2-(CH_2)_n-OC(O)CHXCH_3$, $(CH_3)_2CX-CO_2-(CH_2)_n-OC(O)CX(CH_3)_2$, $X_2CH-CO_2-(CH_2)_n-OC(O)CHX_2$, $CH_3CX_2-CO_2-(CH_2)_n-OC(O)CX_2CH_3$, $XCH_2C(O)C(O)CH_2X$, $CH_3CHXC(O)C(O)CHXCH_3$, $XC(CH_3)_2C(O)C(O)CX(CH_3)_2$, $X_2CHC(O)C(O)CHX_2$, $CH_3CX_2C(O)C(O)CX_2CH_3$, $XCH_2-C(O)-CH_2X$, $CH_3-CHX-C(O)-CHX-CH_3$, $CX(CH_3)_2-C(O)-CX(CH_3)_2$, $X_2CH-C(O)-CHX_2$, $C_6H_5-CHX-(CH_2)_n-CHX-C_6H_5$, $C_6H_5-CX_2-(CH_2)_n-CX_2-C_6H_5$, $CX_2-(CH_2)_n-CX_2-C_6H_5$, o-, m- or p-$XCH_2$-Ph-$CH_2X$, o-, m- or p-$CH_3CHX$-Ph-$CHXCH_3$, o-, m- or p-$(CH_3)_2CX$-Ph-$CX(CH_3)_2$, o-, m- or p-$CH_3CX_2$-Ph-$CX_2CH_3$, o-, m- or p-$X_2CH$-Ph-$CHX_2$, o-, m- or p-$XCH_2-CO_2$-Ph-$OC(O)CH_2X$, o-, m- or p-$CH_3CHX-CO_2$-Ph-$OC(O)CHXCH_3$, o-, m- or p-$(CH_3)_2CX-CO_2$-Ph-$OC(O)CX(CH_3)_2$, $CH_3CX_2-CO_2$-Ph-$OC(O)CX_2CH_3$, o-, m- or p-$X_2CH-CO_2$-Ph-$OC(O)CHX_2$ or o-, m- or p-$XSO_2$-Ph-$SO_2X$ (X stands for chlorine, bromine or iodine; Ph stands for phenylene ($C_6H_4$); R represents an aliphatic radical of 1 to 20 carbon atoms, which may be linear, branched or else cyclic in structure, may be saturated or mono- or polyunsaturated and may contain one or more aromatics or else is aromatic-free, and n is a number between 0 and 20). Preference is given to using 1,4-butanediol di(2-bromo-2-methylpropionate), 1,2-ethylene glycol di(2-bromo-2-methylpropionate), diethyl 2,5-dibromoadipate or diethyl 2,3-dibromomaleate. The ratio of initiator to monomer gives the later molecular weight, provided that all of the monomer is reacted.

Catalysts for ATRP are set out in Chem. Rev. 2001, 101, 2921. The description is predominantly of copper complexes—among others, however, compounds of iron, of rhodium, of platinum, of ruthenium or of nickel are employed. In general it is possible to use any transition metal compounds which with the initiator, or with the polymer chain which has a transferable atomic group, are able to form a redox cycle. Copper can be supplied to the system for this purpose, for example, starting from $Cu_2O$, CuBr, CuCl, CuI, $CuN_3$, CuSCN, CuCN, $CuNO_2$, $CuNO_3$, $CuBF_4$, $Cu(CH_3COO)$ or $Cu(CF_3COO)$.

One alternative to the ATRP described is represented by a variant of it: in so-called reverse ATRP, compounds in higher oxidation states can be used, such as $CuBr_2$, $CuCl_2$, CuO, $CrCl_3$, $Fe_2O_3$ or $FeBr_3$, for example. In these cases the reaction can be initiated by means of conventional free-radical initiators such as, for example, AIBN. In this case the transition metal compounds are first reduced, since they are reacted with the radicals generated from the conventional free-radical initiators. Reverse ATRP has been described by, among others, Wang and Matyjaszewski in Macromolecules (1995), vol. 28, p. 7572 ff.

One variant of reverse ATRP is represented by the additional use of metals in the zero oxidation state. As a result of an assumed comproportionation with the transition metal compounds in the higher oxidation state, an acceleration is brought about in the reaction rate. This process is described in more detail in WO 98/40415.

The molar ratio of transition metal to bifunctional initiator is generally situated in the range from 0.02:1 to 20:1, preferably in the range from 0.02:1 to 6:1 and with particular preference in the range from 0.2:1 to 4:1, without any intention hereby to impose any restriction.

In order to increase the solubility of the metals in organic solvents and at the same time to prevent the formation of stable and hence polymerization-inert organometallic compounds, ligands are added to the system. Additionally the ligands facilitate the abstraction of the transferable atomic group by the transition metal compound. A listing of known ligands is found for example in WO 97/18247, WO 97/47661 or WO 98/40415. As a coordinative constituent, the compounds used as ligand usually contain one or more nitrogen, oxygen, phosphorus and/or sulphur atoms. Particular preference is given in this context to nitrogen compounds. Very particular preference is enjoyed by nitrogen-containing chelate ligands. Examples that may be given include 2,2'-bipyridine, N,N,N',N",N"-pentamethyldiethylenetriamine (PMDETA), tris(2-aminoethyl)amine (TREN), N,N,N',N'-tetramethylethylenediamine or 1,1,4,7,10,10-hexamethyltriethylenetetramine. Valuable indicators relating to the selection and combination of the individual components are found by the skilled person in WO 98/40415.

These ligands may form coordination compounds in situ with the metal compounds or they may first be prepared as coordination compounds and then introduced into the reaction mixture.

The ratio of ligand (L) to transition metal is dependent on the density of the ligand and on the coordination number of the transition metal (M). In general the molar ratio is situated in the range 100:1 to 0.1:1, preferably 6.1 to 0.1:1 and with particular preference 3:1 to 1:1, without any intention hereby to impose any restriction.

When ATRP has taken place, the transition metal compound can be precipitated by the addition of a suitable sulphur compound. By addition of mercaptans, for example, the halogen atom at the end of the chain is substituted, with release of a hydrogen halide. The hydrogen halide—HBr, for example—protonates the ligand L, coordinated on the transition metal, to form an ammonium halide. As a result of this process, the transition metal-ligand complex is quenched and the "bare" metal is precipitated. After that the polymer solution can easily be purified by means of a simple filtration. The said sulphur compounds are preferably compounds containing an SH group. With very particular preference they are one of the regulators known from free-radical polymerization, such as ethylhexyl mercaptan or n-dodecyl mercaptan. To increase the degree of silyl functionalization it is also possible to use silyl mercaptans such as, for example, 3-mercaptopropyltrimethoxysilane, which can be obtained as Dynasylan® MTMO from Evonik AG.

A broad field of application is produced for these products. The selection of the use examples is not such as to restrict the use of the polymers of the invention. The examples are intended merely to serve as random samples of the broad functional capacity of the polymers described. Block copolymers of the composition ABA, ACBCA, CABAC or CDBDC are employed preferably as prepolymers for a moisture-curing crosslinking. The prepolymers can be crosslinked with any desired polymers. D blocks are polymer blocks which on the one hand correspond in their basic composition to the B block, and not to the C blocks, and on the other hand contain silyl-functional units.

The preferred applications for the block copolymers of the invention with ABA, ACBCA, CDBDC or CA'BA'C with ≦4 silyl groups in the individual A or D blocks are to be found in sealants, in reactive hot-melt adhesives or in adhesive bonding compositions. Particularly appropriate uses are in sealants for applications in the fields of automotive engineering, shipbuilding, container construction, mechanical engineering and aircraft engineering, and also in the electrical industry and in the building of domestic appliances. Further preferred fields of application are those of sealants for building applications, heat-sealing applications or assembly adhesives.

With the new binders it is possible to prepare one-component and two-component elastomers for example for one of the recited applications. Typical ingredients of a formulation are the binder, solvents, fillers, pigments, plasticizers, stabilizing additives, water scavengers, adhesion promoters, thixotropic agents, crosslinking catalysts, tackifiers, etc.

In order to reduce the viscosity it is possible to use solvents, examples being aromatic hydrocarbons (e.g. toluene, xylene, etc.), esters (e.g. ethyl acetate, butyl acetate, amyl acetate, Cellosolve acetate, etc.), ketones (e.g. methyl ethyl ketone, methyl isobutyl ketone, diisobutyl ketone, etc.), etc. The solvent may be added as early as during the free-radical polymerization.

Crosslinking catalysts for hydrosilylated binders in a formulation for example with corresponding polyurethanes are the common organic tin, lead, mercury and bismuth catalysts, examples being dibutyltin dilaurate (e.g. from BNT Chemicals GmbH), dibutyltin diacetate, dibutyltin diketonate (e.g. Metatin 740 from Acima/Rohm+Haas), dibutyltin dimaleate, tin naphthenate, etc. It is also possible to use reaction products of organic tin compounds, such as dibutyltin dilaurate, with silicic esters (e.g. DYNASIL A and 40), as crosslinking catalysts. Also, in addition, titanates (e.g. tetrabutyl titanate, tetrapropyl titanate, etc.), zirconates (e.g. tetrabutyl zirconate, etc.), amines (e.g. butylamine, diethanolamine, octylamine, morpholine, 1,3-diazabicyclo[5.4.6]undec-7-ene (DBU), etc.) and/or their carboxylic salts, low molecular mass polyamides, amino organosilanes, sulphonic acid derivatives, and mixtures thereof. The fraction of the crosslinking catalyst in the formulation is preferably 0.01 to 20 parts per 100 parts of binder, with particular preference 0.01 to 10 parts.

The examples given below are given for the purpose of improved illustration of the present invention, but are not apt to restrict the invention to the features disclosed herein.

EXAMPLES

The number-average and weight-average molecular weights, Mn and Mw, and the molecular weight distributions, Mw/Mn, are determined by means of gel permeation chromatography (GPC) in tetrahydrofuran against a PMMA standard.

Example 1

A jacketed vessel equipped with stirrer, thermometer, reflux condenser, nitrogen introduction tube and dropping funnel was charged under an $N_2$ atmosphere with monomer 1 a (precise identification and quantity in Table 1), 125 ml of propyl acetate, 0.5 g of copper(I) oxide and 1.3 g of N,N,N', N'',N''-pentamethyl-diethylenetriamine (PMDETA). The solution is stirred at 80° C. for 15 minutes. Subsequently, at the same temperature, 1,4-butanediol di(2-bromo-2-methylpropionate) (BDBIB; for amount see Table 1) initiator in solution in 25 ml of propyl acetate is added dropwise. After the polymerization time of three hours a sample is taken for determination of the average molar weight $M_n$ (by means of SEC) and a mixture of monomer 2a and monomer 3a (precise identification and quantity in Table 1) is added. The mixture is polymerized to an anticipated conversion of at least 95% and is terminated by addition of 2.1 g of n-dodecyl mercaptan. The solution is worked up by filtration over silica gel and the subsequent removal of volatile constituents by means of distillation. The average molecular weight is determined, finally, by SEC measurements. The fraction of incorporated monomer 3a is quantified by means of $^1$H NMR measurements.

Example 2

In the same way as in Example 1, monomers 1b, 2b and 3b (precise identification and quantity in Table 1) are used.

Example 3

In the same way as in Example 1, monomers 1c, 2c and 3c (precise identification and quantity in Table 1) are used.

Example 4

In the same way as in Example 1, monomers 1d, 2d and 3d (precise identification and quantity in Table 1) are used.

TABLE 1

| Example | 1 | 2 | 3 | 4 |
|---|---|---|---|---|
| Monomer 1 | 1a) MMA | 1b) n-BA | 1c) n-BA | 1d) MMA |
| Amount | 81.0 g | 79.6 g | 79.6 g | 81.1 g |
| Monomer 2 | 2a) MMA | 2b) MMA | 2c) n-BA | 2d) n-BA |
| Amount | 19.9 g | 19.9 g | 20.0 g | 20.1 g |
| Monomer 3 | 3a) MEMO | 3b) MEMO | 3c) MEMO | 3d) MEMO |
| Amount | 4.8 g | 4.8 g | 4.8 g | 4.8 g |
| Initiator amount | 1.25 g | 1.25 g | 1.25 g | 1.25 g |
| $M_n$ (1st stage) | 21600 | 17800 | 18100 | 20400 |
| D | 1.21 | 1.22 | 1.28 | 1.26 |
| $M_n$ (end product) | 26800 | 20300 | 22500 | 23100 |
| D | 1.31 | 1.36 | 1.38 | 1.40 |

MMA = methyl methacrylate;
n-BA = n-butyl acrylate,
MEMO = Dynasylan MEMO (3-methacryloyloxypropyltrimethoxysilane)

Whereas the molecular weight distributions of the first stage are monomodal, the distributions of the final stages exhibit a more or less pronounced high molecular mass shoulder. The latter are attributable to side reactions of the silyl groups with partial chain dimerization. After removal of the solvent, the products can be stabilized by adding suitable desiccants. In this way it is possible to ensure good storage stability without a further increase in molecular weight.

Example 5

A jacketed vessel equipped with stirrer, thermometer, reflux condenser, nitrogen introduction tube and dropping funnel was charged under an $N_2$ atmosphere with monomer Ia (precise identification and quantity in Table 2), 145 ml of propyl acetate, 0.62 g of copper(I) oxide and 1.6 g of N,N,N', N'',N''-penta-methyldiethylenetriamine (PMDETA). The solution is stirred at 80° C. for 15 minutes. Subsequently, at the same temperature, 1,4-butanediol di(2-bromo-2-methylpropionate) (BDBIB; for amount see Table 1) initiator in solution in 30 ml of propyl acetate is added dropwise. After the polymerization time of three hours a sample is taken for determination of the average molar weight $M_n$ (by means of SEC) and monomer IIa (precise identification and quantity in Table 2) is added. After a calculated 95% conversion, finally, a mixture of monomer IIa' and monomer IIIa (for precise identification and amount see Table 2) is added. The mixture is polymerized to an anticipated conversion of at least 95% and is terminated by addition of 2.4 g of n-dodecyl mercaptan. The solution is worked up by filtration over silica gel and the subsequent removal of volatile constituents by means of distillation. The average molecular weight is determined, finally, by SEC measurements. The fraction of incorporated monomer 3a is quantified by means of $^1$H NMR measurements.

Example 6

A jacketed vessel equipped with stirrer, thermometer, reflux condenser, nitrogen introduction tube and dropping funnel was charged under an $N_2$ atmosphere with monomer Ib (precise identification and quantity in Table 2), 150 ml of propyl acetate, 0.60 g of copper(I) oxide and 1.6 g of N,N,N', N'',N''-penta-methyldiethylenetriamine (PMDETA). The solution is stirred at 80° C. for 15 minutes. Subsequently, at the same temperature, 1,4-butanediol di(2-bromo-2-methylpropionate) (BDBIB; for amount see Table 1) initiator in solution in 35 ml of propyl acetate is added dropwise. After the polymerization time of three hours a sample is taken for determination of the average molar weight $M_n$ (by means of SEC) and a mixture of monomer IIb and monomer IIIb (precise identification and quantity in Table 2) is added. After a calculated 95% conversion, finally, monomer IIb' (for precise identification and amount see Table 2) is added. The mixture is polymerized to an anticipated conversion of at least 95% and is terminated by addition of 2.4 g of n-dodecyl mercaptan. The solution is worked up by filtration over silica gel and the subsequent removal of volatile constituents by means of distillation. The average molecular weight is determined, finally, by SEC measurements. The fraction of incorporated monomer 3a is quantified by means of $^1$H NMR measurements.

TABLE 2

| Example | 5 | 6 |
|---|---|---|
| Monomer I | Ia) n-BA | Ib) n-BA |
| Amount | 95.2 g | 96.5 g |

TABLE 2-continued

| Example | 5 | 6 |
|---|---|---|
| Monomer II | IIa) MMA | IIb) MMA |
| Amount | 19.8 g | 4.2 g |
| Monomer II' | IIa') MMA | IIb') MMA |
| Amount | 4.0 g | 19.8 g |
| Monomer III | IIIa) MEMO | IIIb) MEMO |
| Amount | 5.9 g | 5.0 g |
| Initiator amount | 1.70 g | 1.62 g |
| $M_n$ (1st stage) | 17800 | 26700 |
| D | 1.22 | 1.31 |
| $M_n$ (2nd stage) | 21600 | 30500 |
| D | 1.23 | 1.47 |
| $M_n$ (3rd stage)[1] | 23400 | 32000 |
| D | 1.36 | 1.63 |

MMA = methyl methacrylate;
n-BA = n-butyl acrylate,
MEMO = Dynasylan MEMO (3-methacryloyloxypropyltrimethoxysilane);
[1]GPC measurements of the third stage before addition of the mercaptan In the case of the pentablock copolymers as well, the molecular weight distribution increases after the polymerization stages containing Dynasylan® MEMO, and in the eluogram there is a more or less strongly pronounced high molecular mass shoulder discernible.

The invention claimed is:

1. A block copolymer of composition ACDCA, comprising at least 1 and at most 4 silyl groups per individual A block, and comprising in copolymerized form said A block, a copolymer comprising a silyl functionalized (meth)acrylate and a non-silyl functional (meth)acrylate, and block B, comprising at least one (meth)acrylate with no silyl function, the composition of which differs from the compositions of the non-silyl-functional (meth)acrylate from block A;
wherein block A and block B are arranged in an ABA block structure;
wherein the B block has a CDC triblock structure;
wherein the composition of the C block corresponds to the composition of a non-silyl-functionalized fraction in the A block.

2. The block copolymer according to claim 1, wherein the A block has a composition with at least 1 and at most 2 silyl groups.

3. The block copolymer according to claim 1, wherein the A block is less than 25% of the total weight of the block copolymer.

4. The block copolymer according to claim 3, wherein the A block is less than 10% of the total weight of the block copolymer.

5. The block copolymer according to claim 1, wherein the monomers used for functionalization of the A segments comprise an unsaturated, free- radically polymerizable group and a silyl group, wherein the silyl group has the formula

where the organic radicals $R^1$ and $R^2$ are each identical or different to one another and are selected from the group of aliphatic hydrocarbon radicals consisting of 1 to 20 carbon atoms and being linear, branched or cyclic, and $R^1$ may also exclusively be hydrogen,
X is selected from the group of hydrolysable radicals which are other than alkoxy and hydroxyl,
a, b and c are each integers between 0 and 3, and the sum of a, b and c is 3.

6. A process for preparing a block copolymer of composition ACDCA, comprising:
sequentially effected atom transfer radical polymerizing (ATRP) a block A and a block B, to obtain a block copolymer in which block A and block B are arranged in an ABA block structure;
wherein the A block is obtained from a mixture of a silyl-functionalized (meth)acrylate and a (meth)acrylate monomer or mixtures thereof, wherein said A block has <4 silyl groups;
wherein the B block comprises at least one (meth)acrylate with no silyl functionality; and
wherein said process for preparing said block copolymer is conducted in the presence of an initiator and of a catalyst in a halogen-free solvent;
wherein the B block has a CDC triblock structure;
wherein the composition of the C block corresponds to the composition of a non-silyl-functionalized fraction in the A block.

7. The process for preparing a block copolymer according to claim 6, wherein the initiator is a bifunctional initiator.

8. The process for preparing a block copolymer according to claim 6, wherein the catalyst is a transition metal compound and the ligand is a chelate ligand comprising N.

9. The process for preparing a block copolymer according to claim 6, wherein the block copolymer has a number-average molecular weight of between 5000 g/mol and 100 000 g/mol.

10. The process for preparing block copolymer according to claim 6, wherein the block copolymer has a number-average molecular weight of between 7500 g/mol and 50 000 g/mol.

11. The process for preparing block copolymer according to claim 6, wherein the block copolymer has a molecular weight distribution of less than 1.6.

12. The process for preparing a block copolymer according to claim 6, wherein after completion of the ATRP polymerization the catalyst is precipitated by addition of a mercaptan or a compound comprising a thiol group and separated from the polymer solution by filtration.

13. A hot melt adhesive, comprising:
a block copolymer of composition ACDCA, comprising:
<4 silyl-functionalized groups per individual A block,
and comprising in copolymerized form
said A block, a copolymer comprising a silyl functionalized (meth)acrylate and a non-silyl functional (meth)acrylate, and
block B, comprising at least one (meth)acrylate with no silyl function, the composition of which differs from the composition of the non-silyl-functional (meth)acrylate from block A;
wherein block A and block B are arranged in an ABA block structure;
wherein the B block has a CDC triblock structure;
wherein the composition of the C block corresponds to the composition of a non-silyl-functionalized fraction in the A block.

14. A method of heat sealing, comprising:
applying to a substrate a block copolymer of composition ACDCA, comprising:
<4 silyl-functionalized groups per individual A block,
and comprising in copolymerized form
said A block, a copolymer comprising a silyl functionalized (meth)acrylate and a non-silyl functional (meth)acrylate, and block B, comprising at least one (meth)acrylate with no silyl function, the composition of which differs from the composition of the non-silyl-functional (meth)acrylate from block A;
wherein block A and block B are arranged in an ABA block structure;
wherein the B block has a CDC triblock structure;
wherein the composition of the C block corresponds to the composition of a non-silyl-functionalized fraction in the A block.

15. A block copolymer of composition CA'BNC, comprising:
at least 1 and at most 4 silyl groups per individual A block, and
comprising in copolymerized form
block A, a copolymer comprising a silyl-functionalized (meth)acrylate and a non-silyl functional (meth)acrylate,
wherein the A block has a CA' diblock structure;
the A' block comprising a mixture of silyl-functionalized (meth)acrvlate and non-silyl-functionalized (meth)acrylate,
the C block comprising no silyl-functionalized (meth)acrylate,
otherwise conforming to the composition of the A' block; and
block B, comprising at least one (meth)acrylate with no silyl function; the composition of which differs from the composition of the non-silyl-functional (meth)acrylate from block A.

16. The block copolymer according to claim 15, wherein the A block of the block copolymer has a composition with at least 1 and at most 2 silyl groups.

17. The block copolymer according to claim 15, wherein the A block is less than 25% of the total weight of the block copolymer.

18. The block copolymer according to claim 17, wherein the A block is less than 10% of the total weight of the block copolymer.

19. The block copolymer according to claim 15, wherein the monomers used for functionalization of the A segments comprise an unsaturated, free-radically polymerizable group and a silyl group, wherein the silyl group has the formula

—Si(OR$^1$)$_b$R$^2_a$X$_c$ where the organic radicals R$^1$ and R$^2$ are each identical or different to one another and are selected from the group of aliphatic hydrocarbon radicals consisting of 1 to 20 carbon atoms and being linear, branched or cyclic, and R$^1$ may also exclusively be hydrogen,
X is selected from the group of hydrolysable radicals which are other than alkoxy and hydroxyl,
a, b and c are each integers between 0 and 3, and the sum of a, b and c is 3.

20. A process for preparing a block copolymer of composition CA'BA'C, comprising:
sequentially effected atom transfer radical polymerizing (ATRP) a block A and a block B, to obtain a block copolymer in which block A and block B are arranged in an ABA block structure;
wherein the A block is obtained from a mixture of a silyl-functionalized (meth)acrylate and a (meth)acrylate monomer or mixtures thereof, wherein said A block has <4 silyl groups;
wherein the A block has a CA' diblock structure;
the A' block comprising a mixture of silyl-functionalized (meth)acrylate and non-silvl-functionalized (meth)acrylate,
the C block comprising no silyl functionalized (meth)acrylate, otherwise conforming to the composition of the A' block;
wherein the B block is obtained from a (meth)acrylate or mixtures of (meth)acrylate which have no silyl functionality; and
wherein said process for preparing said block copolymer is conducted in the presence of an initiator and of a catalyst in a halogen-free solvent.

21. The process for preparing a block copolymer according to claim 20, wherein the initiator is a bifunctional initiator.

22. The process for preparing a block copolymer according to claim 20, wherein the catalyst is a transition metal compound and the ligand is a chelate ligand comprising N.

23. The process for preparing a block copolymer according to claim 20, wherein the block copolymer has a number-average molecular weight of between 5000 g/mol and 100 000 g/mol.

24. The process for preparing a block copolymer according to claim 20, wherein the block copolymer has a number-average molecular weight of between 7500 g/mol and 50 000 g/mol.

25. The process for preparing a block copolymer according to claim 20, wherein the block copolymer has a molecular weight distribution of less than 1.6.

26. The process for preparing a block copolymer according to claim 20, wherein after completion of the ATRP polymerization the catalyst is precipitated by addition of a mercaptan or a compound comprising a thiol group and separated from the polymer solution by filtration.

27. A hot melt adhesive, comprising:
a block copolymer of composition CA'BA'C, comprising:
at least 1 and at most 4 silyl groups per individual A block, and
comprising in copolymerized form
block A, a copolymer comprising a silyl-functionalized (meth)acrylate and a non-silyl functional (meth)acrylate,
wherein the A block has a CA' diblock structure;
the A' block comprising a mixture of silyl-functionalized (meth)acrylate and non-silyl-functionalized (meth)acrylate,
the C block comprising no silyl-functionalized (meth)acrylate,
otherwise conforming to the composition of the A' block; and
block B, comprising at least one (meth)acrylate with no silyl function; the composition of which differs from the composition of the non-silyl-functional (meth)acrylate from block A.

28. A method of heat sealing, comprising:
Applying to a substrate a block copolymer of composition CA'BA'C, comprising:
at least 1 and at most 4 silyl groups per individual A block, and
comprising in copolymerized form
block A, a copolymer comprising a silyl-functionalized (meth)acrylate and a non-silyl functional (meth)acrylate,
wherein the A block has a CA' diblock structure;
the A' block comprising a mixture of silyl-functionalized (meth)acrylate and non-silyl-functionalized (meth)acrylate, the C block comprising no silyl-functionalized (meth)acrylate,
otherwise conforming to the composition of the A' block; and
block B, comprising at least one (meth)acrylate with no silyl function; the composition of which differs from the composition of the non-silyl-functional (meth)acrylate from block A.

* * * * *